(12) United States Patent
Holder

(10) Patent No.: US 7,278,261 B1
(45) Date of Patent: Oct. 9, 2007

(54) PUMP APPARATUS

(75) Inventor: Lonnie E. Holder, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 4 days.

(21) Appl. No.: 11/251,361

(22) Filed: Oct. 14, 2005

Related U.S. Application Data

(63) Continuation of application No. 10/436,037, filed on May 12, 2003, now Pat. No. 6,971,233.

(51) Int. Cl.
*F04B 23/10* (2006.01)
*F04B 1/22* (2006.01)

(52) U.S. Cl. .......................... 60/456; 60/486

(58) Field of Classification Search ............... 60/458, 60/468, 484, 486, 487
See application file for complete search history.

(56) References Cited

U.S. PATENT DOCUMENTS

| | | | |
|---|---|---|---|
| 3,279,172 A | 10/1966 | Kudo et al. | |
| 3,643,433 A | 2/1972 | Widmaier | |
| 5,392,670 A | 2/1995 | Hauser | |
| 5,800,134 A | 9/1998 | Hasegawa et al. | |
| 6,332,393 B1 | 12/2001 | Trimble | |
| 6,382,339 B1 | 5/2002 | Nemoto | |
| 6,425,244 B1 | 7/2002 | Ohashi et al. | |
| 6,487,856 B1 | 12/2002 | Ohashi et al. | |
| 6,487,857 B1 | 12/2002 | Poplawski et al. | |
| 6,494,686 B1 | 12/2002 | Ward | |
| 6,672,843 B1 | 1/2004 | Holder et al. | |
| 6,705,840 B1 | 3/2004 | Hauser et al. | |
| 6,953,327 B1 * | 10/2005 | Hauser et al. | 60/486 |
| 6,971,233 B1 | 12/2005 | Holder | |
| 2003/0188909 A1 | 10/2003 | Ohashi et al. | |
| 2004/0237490 A1 | 12/2004 | Yasuda et al. | |

FOREIGN PATENT DOCUMENTS

JP      2000-009023      1/2000

OTHER PUBLICATIONS

U.S. Appl. No. 11/068,702, filed Feb. 28, 2005.

* cited by examiner

*Primary Examiner*—Thomas E. Lazo
(74) *Attorney, Agent, or Firm*—Neal, Gerber & Eisenberg LLP

(57) ABSTRACT

An end cap adaptable for use with either a dual hydraulic pump unit having two pumps in a side-by-side arrangement or a pair of separate hydraulic pumps having separate housings. The internal structure of the end cap is arranged in such a manner to permit the separation of the single end cap into two separate end caps. An adapter plate may also be used to attach separate end caps to a single pump housing for use as a dual pump unit.

17 Claims, 14 Drawing Sheets

PUMP APPARATUS

RELATED APPLICATIONS

This application is a continuation of U.S. patent application Ser. No. 10/436,037 filed May 12, 2003 now U.S. Pat. No. 6,971,233. This prior application is incorporated herein by reference.

BACKGROUND OF THE INVENTION

This application relates in general to hydraulic pumps and in particular to an end cap device for sealably enclosing one or more hydraulic pumps within a pump housing. Hydraulic pumps are used in driving vehicles such as tractors and other off-road devices. Such pumps are also used in a wide variety of industrial applications other than vehicles. Single and dual pump configurations are common.

Typical hydraulic pump units include one or more pumps enclosed in a pump housing when an end cap is sealably mounted to the pump housing. Known designs include those shown in U.S. Pat. Nos. 6,332,393; 6,487,857; 6,705,840; and 6,672,843, all of which are under common assignment with this invention. All of the above patents are incorporated herein by reference.

In one known arrangement, a plurality of pumps may be mounted in individual housings on a vehicle frame. In such a configuration, each pump transmits hydraulic fluid through a high-pressure hose to a hydrostatic motor. Individual end caps sealably secure each pump within its respective pump housing and the end caps form porting chambers that provide fluid communication between the pump, the hoses leading to a hydrostatic motor and one or more valves.

End caps are generally configured and manufactured for use in either single, dual or multiple pump configurations, with each pump requiring a separate and unique end cap design. Thus, depending on the pump configuration desired, a different end cap must be manufactured or cast for use with a single, dual or multiple end cap configuration.

SUMMARY OF THE INVENTION

The present invention is directed to apparatus and methods for increasing the flexibility and ease of use of pump end caps and to provide end caps that can be used with both single and dual pump configurations. One embodiment disclosed herein shows an end cap device that may be configured to be suitable for use with single or dual pump configurations, depending on the application needs. This invention also discloses an interface plate device to allow for two or more single pump end caps to be mounted to a common pump housing to create a dual pump unit. It will be understood that this invention can also be used in a multiple end cap configuration, although a dual pump design is depicted herein as the preferred embodiment.

Other benefits and a more complete understanding of this invention are disclosed in the following specification and drawings.

DETAILED DESCRIPTION OF THE DRAWINGS

Figure 1:
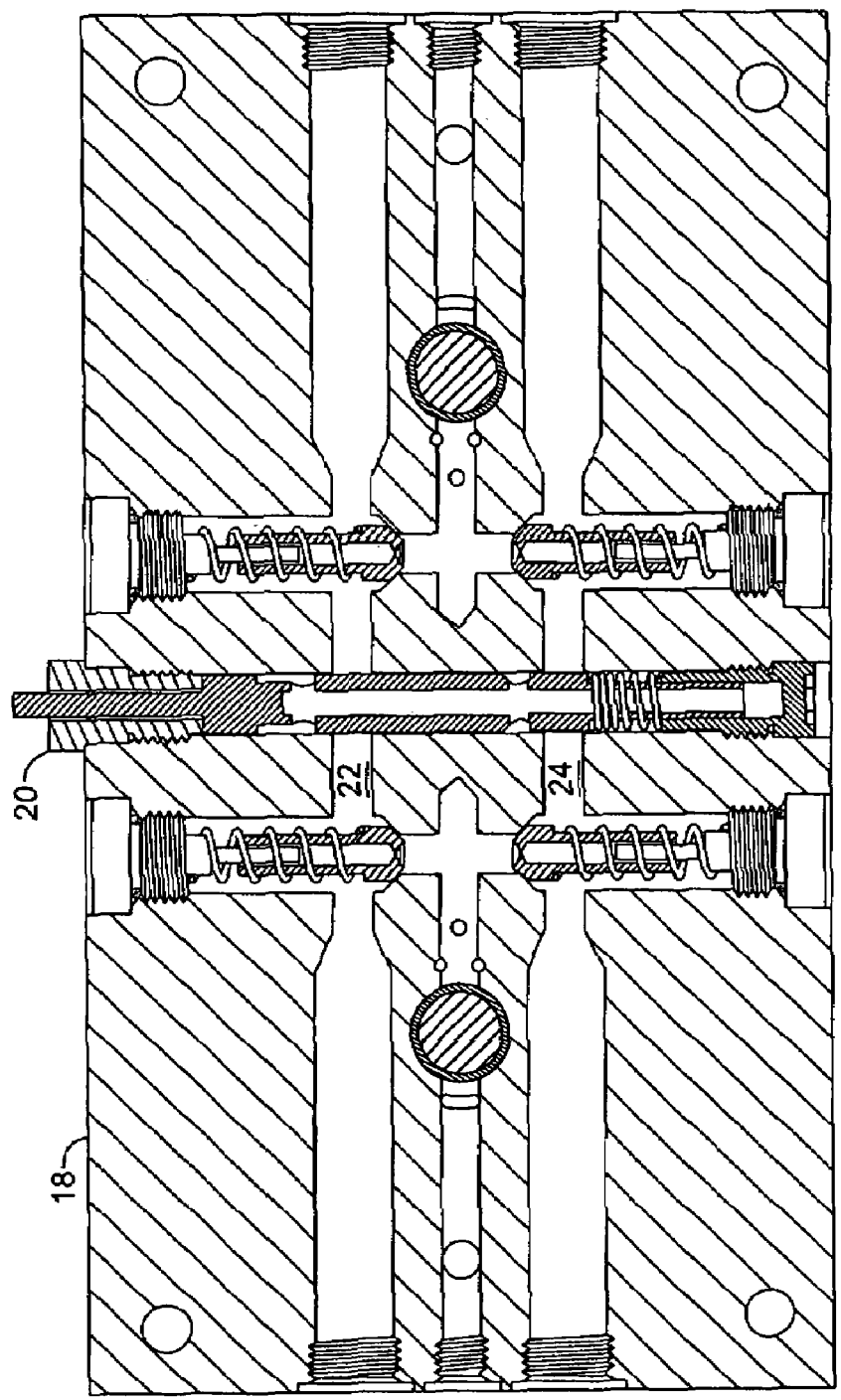
FIG. 1 is cross-sectional, plan view of a dual-pump, end cap configuration.
Figure 2:
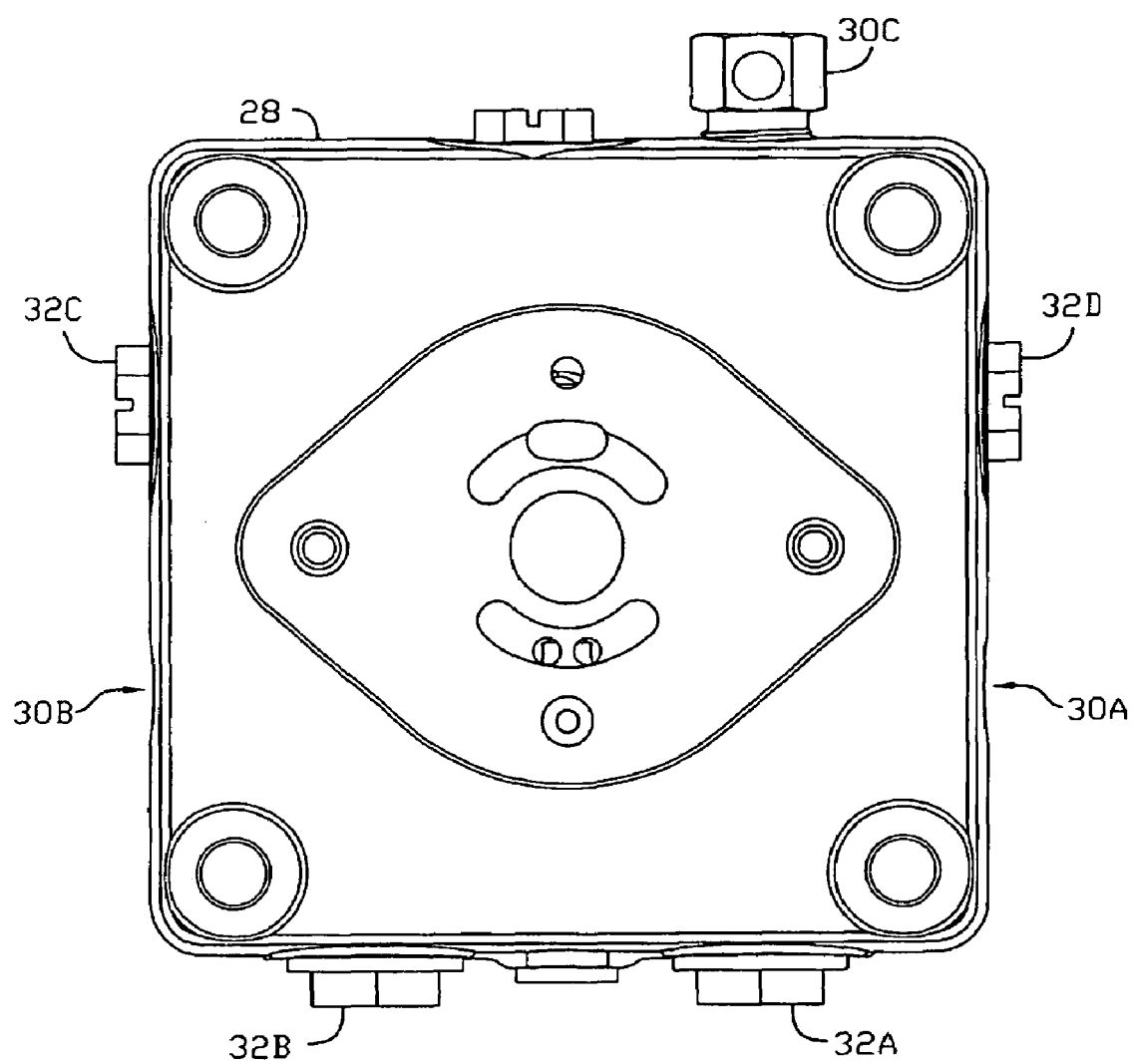
FIG. 2 is a plan view of a single-pump, end cap configuration.

Turning now to the figures, there is generally illustrated in FIGS. 1 and 2 known end cap designs for single and dual pump configurations. For example, FIG. 1 illustrates an end cap 18 for a dual pump configuration such as that disclosed in U.S. patent application Ser. No. 10/118,263. Along the lateral centerline of end cap 18 are located features such as bypass valve 20 and first and second passages 22 and 24 associated with bypass valve 20. There may be a variety of other features comprising end cap 18, such as charge pump passages, attachment bolt holes, and other features necessary for the function of the end cap, but not critical to an understanding of the present invention. End cap 18 is designed to simultaneously support the operation of two hydraulic pumps while minimizing the components and machining required for such support, and it would be nonfunctional if separated into two separate pump end caps.

In FIG. 2 an end cap 28 for a single pump configuration is depicted as disclosed in U.S. Pat. No. 6,332,393. In the configuration shown there are various valves 30A-30C and ports 32A-32D for use in the pump apparatus. Given the location of these features, it would be impossible to combine two such end caps 28 side-by-side to create a dual pump end cap such as the configuration shown in FIG. 1. In sum, cap designs such as those disclosed in FIGS. 1 and 2 are unsuitable for manufacture or casting from a common design end cap that can be used in both single and dual pump configurations.

Figure 3:
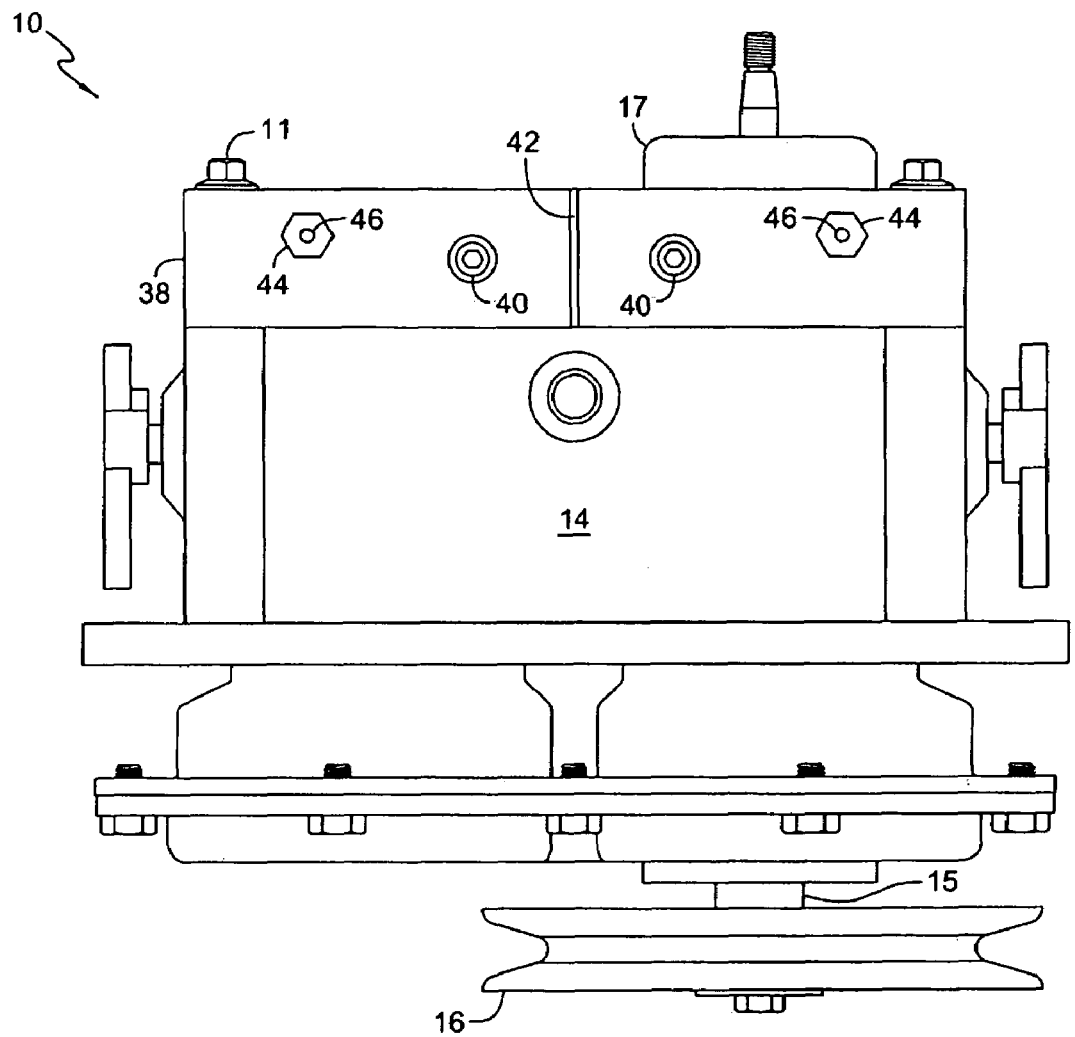
FIG. 3 is a side elevational view of a dual pump unit in accordance with the present invention.
Figure 4:
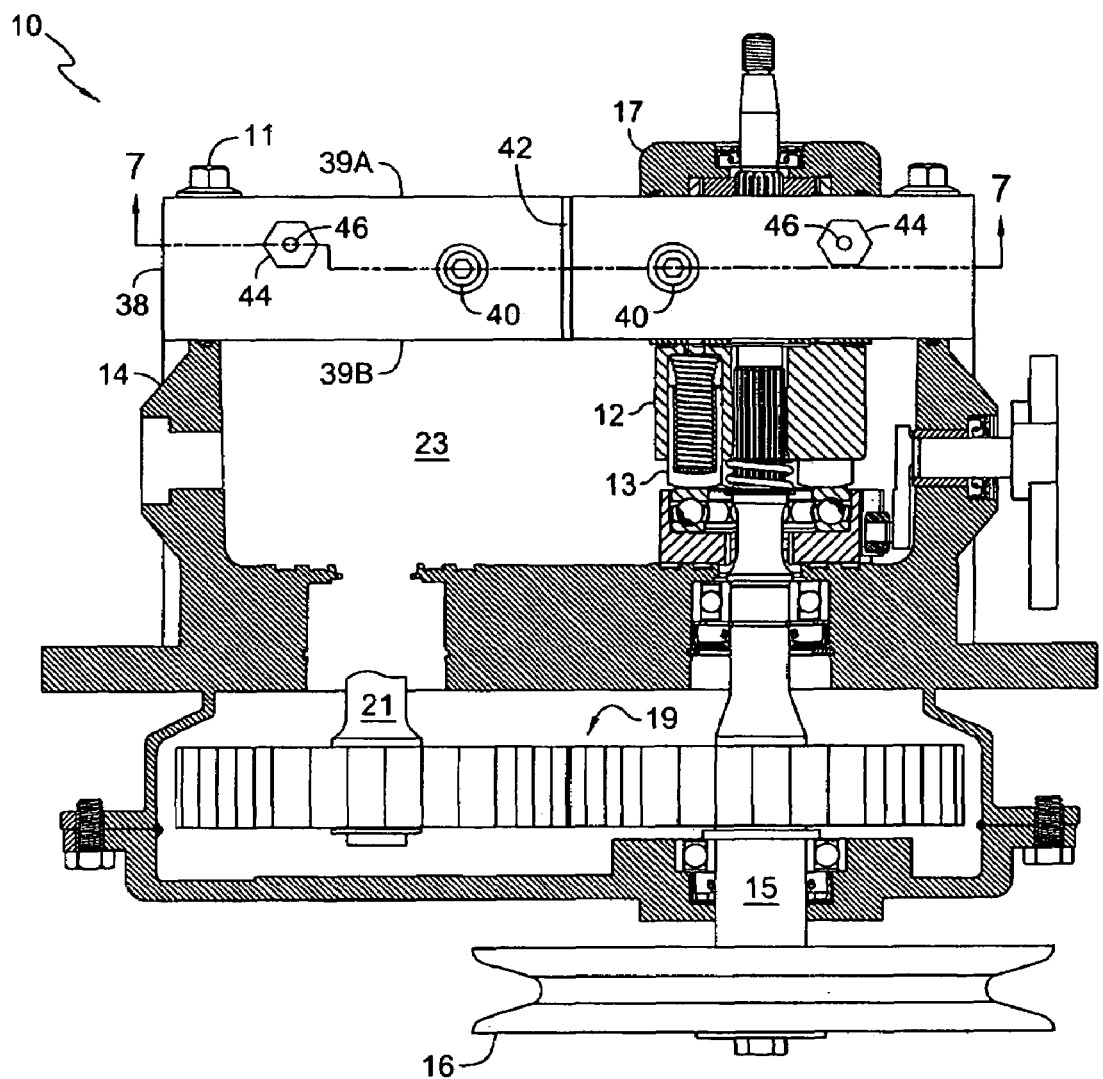
FIG. 4 is a cross-sectional view of the dual pump unit shown in FIG. 3, with certain elements removed for clarity.

An end cap 38 in accordance with a first embodiment of the present invention is shown in one application in FIGS. 3 and 4. In FIG. 4, for purposes of clarity certain elements have been removed and end cap 38 is not cross-sectioned. Specifically, FIGS. 3 and 4 show a dual pump unit 10 with a pump cylinder block 12 rotating on end cap 38. A plurality of pistons 13 are mounted in cylinder block 12. End cap 38 is secured to housing 14 by means of bolts 11 to form a sump 23 in which cylinder block 12 is located. It will be understood that a second cylinder block (not shown) would also be mounted in sump 23, but this element has been eliminated from FIG. 4 for clarity.

Figure 5:
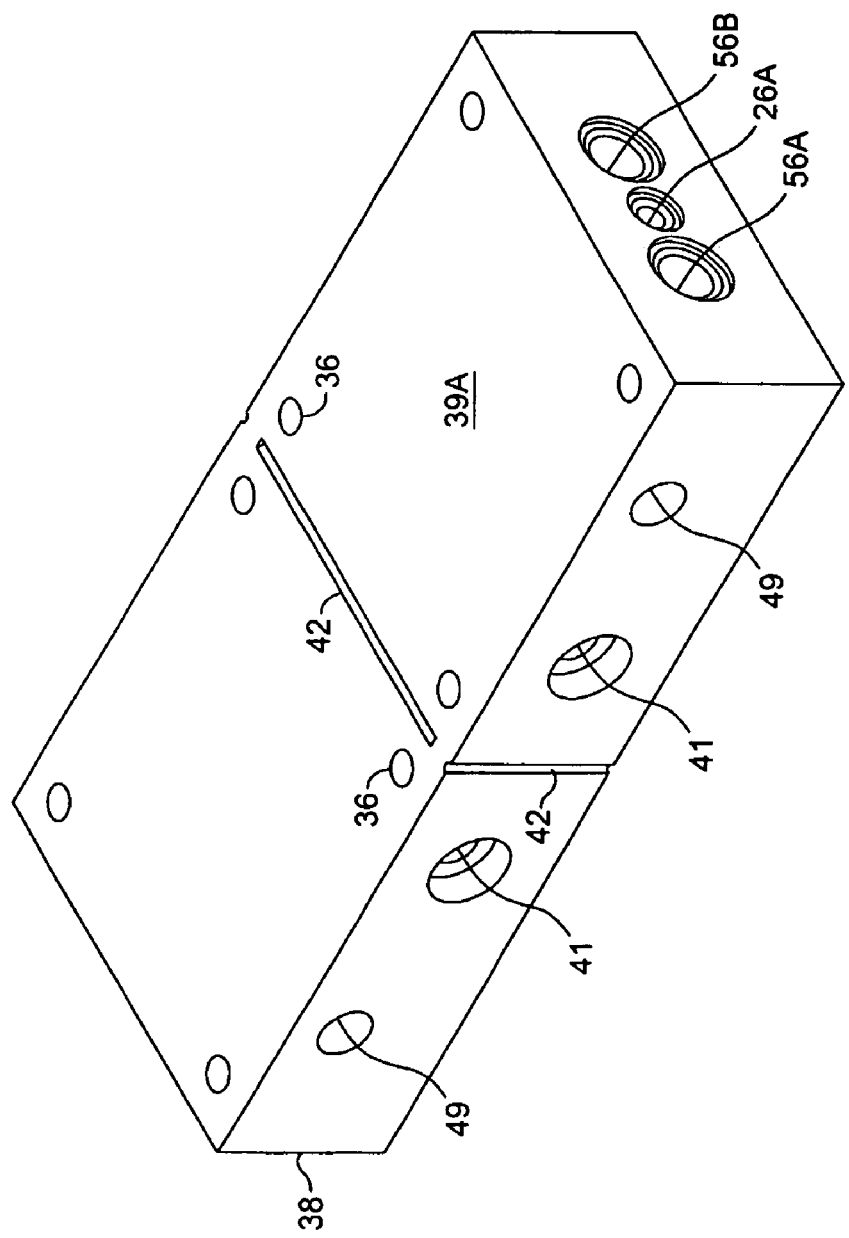
FIG. 5 is a simplified perspective view of an end cap in accordance with the present invention.
Figure 6:
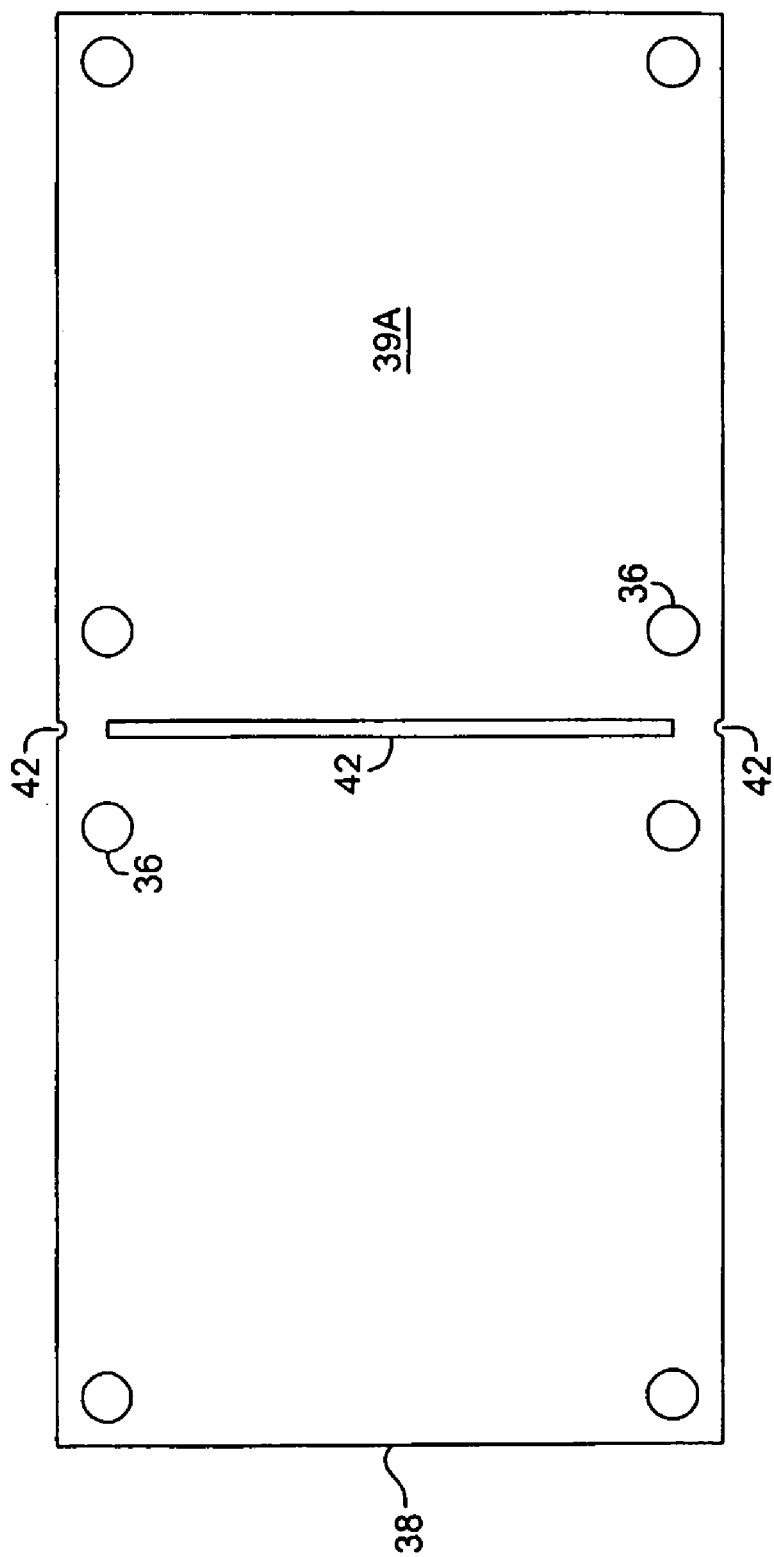
FIG. 6 is a plan view of the end cap shown in FIG. 5.

As will be understood by one of skill in the art, a pump input shaft 15 is driven by pulley 16 to rotate cylinder block 12. Optional features depicted in this embodiment also include a charge pump 17 driven by input shaft 15 and a gear train 19 which transfers rotational force to a second pump shaft 21 which would be used to power the second hydraulic pump (not shown). It will be understood that further alterations of this embodiment will be permissible within the scope of this invention. A simplified version of end cap 38 is shown in FIGS. 5 and 6, where most of the elements have been removed for clarity. For example, FIGS. 5 and 6 do not show most of the porting or openings for the pump input shafts and the like.

End cap 38 can be configured to provide either a dual pump mounting or a single pump mounting by cutting the end cap 38 shown along a lateral centerline thereof where reliefs 42 are formed. Reliefs 42 extend across portions of end cap 38 so that in a configuration where end cap 38 is separated into two individual end caps, the debris from the cutting operation will generally remain below the flat surfaces 39A and 39B of end cap 38, thus simplifying the post-separation cleaning of end cap 38. Minimizing post-separation cleanup is important in that separation preferably occurs after machining, and each additional operation adds risk that the already machined features of end cap 38 might be damaged. While it would be preferable for reliefs 42 to extend across the entire surface of, for example, flat surface 39B, the need to seal housing 14 against surface 39B may require relief 42 on surface 39B extend only partially across surface 39B to leave a contiguous flat region generally near the periphery of flat surface 39B to permit such sealing. Further, while reliefs 42 provide such benefits, they are an optional feature and can be omitted from the design.

Figure 7:
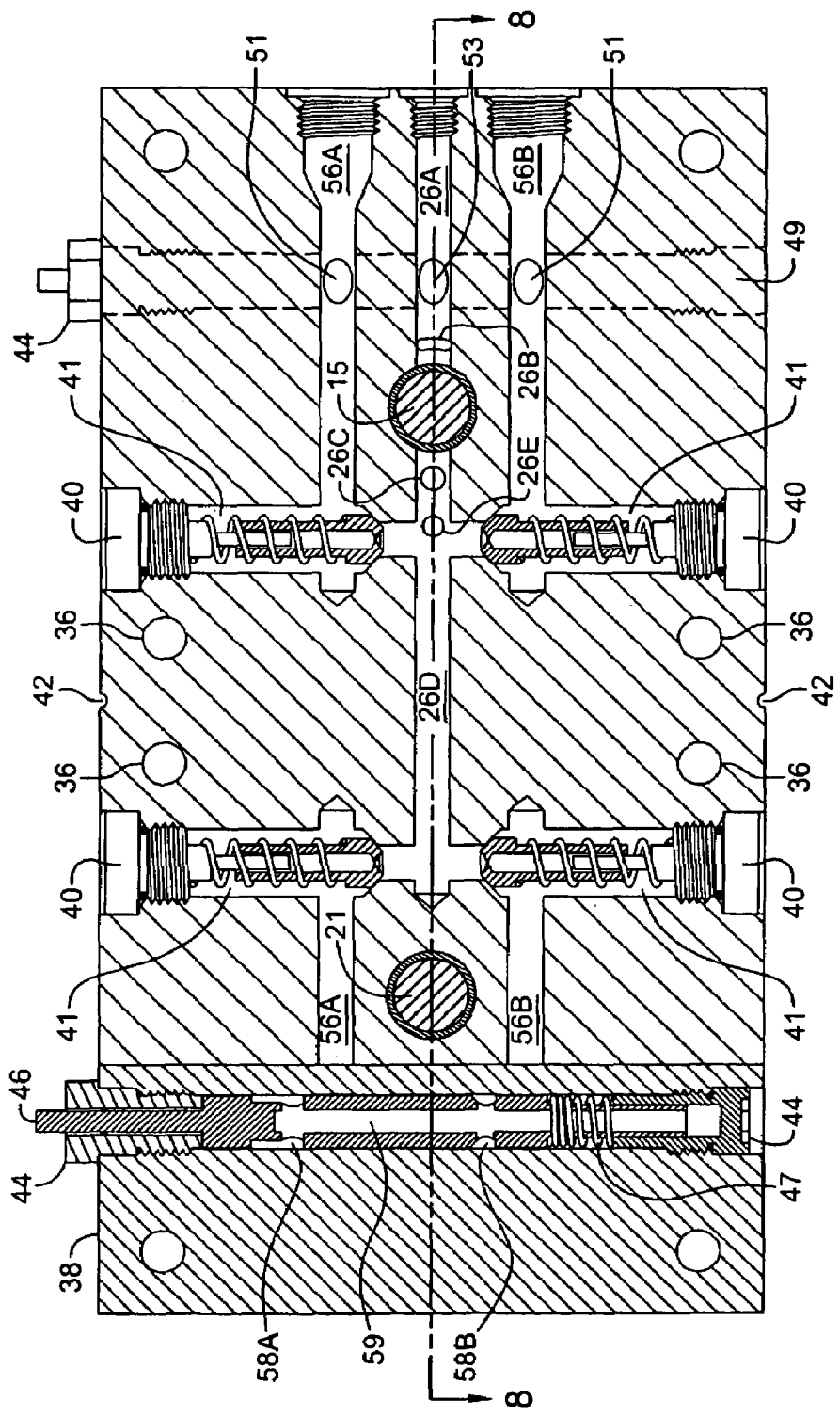
FIG. 7 is a cross-sectional plan view of the end cap, along the lines 7-7 in FIG. 4.
Figure 8:
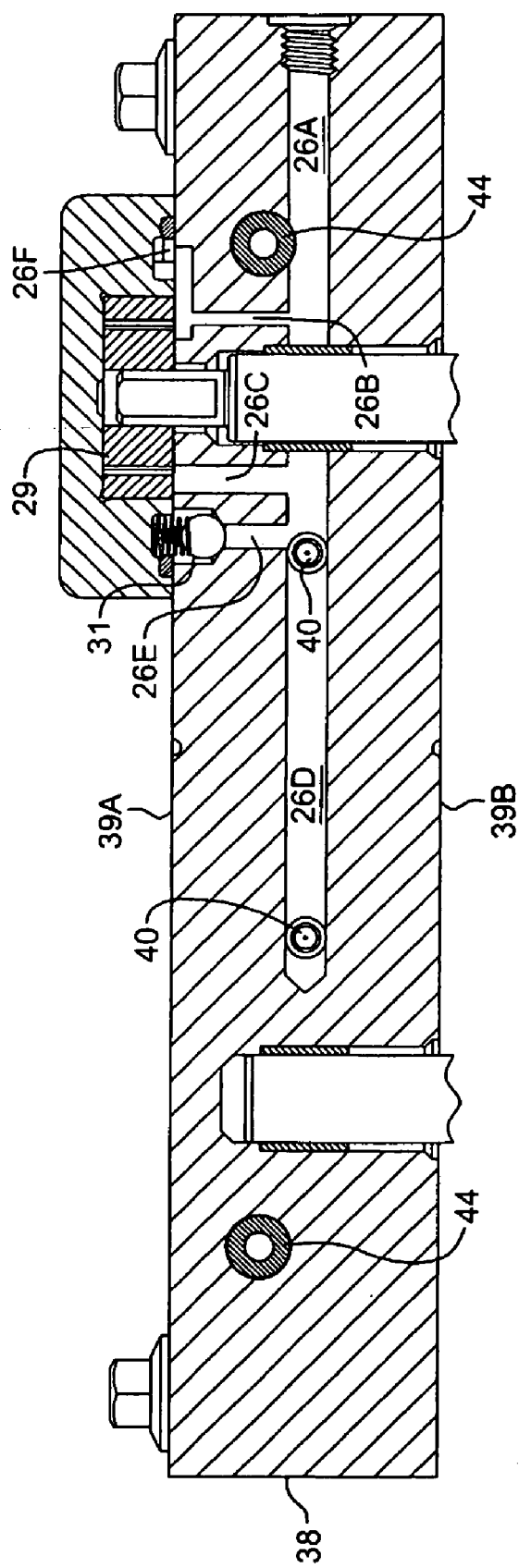
FIG. 8 is a cross-sectional side view along the lines 8-8 in FIG. 7.

FIGS. 7 and 8 depict end cap 38 in accordance with this invention, where end cap 38 includes charge passages 26A and 26B added by machining to channel hydraulic fluid from an external reservoir to a single charge pump 29 on surface 39A of end cap 38. Similarly, charge passages 26C and 26D are also included to provide charge pressure to check valves 40 which are mounted in check ports 41. Other features may also be associated with charge pump 29, such as charge pump relief 31, and passages 26E and 26F associated with charge relief 31.

Figure 9:
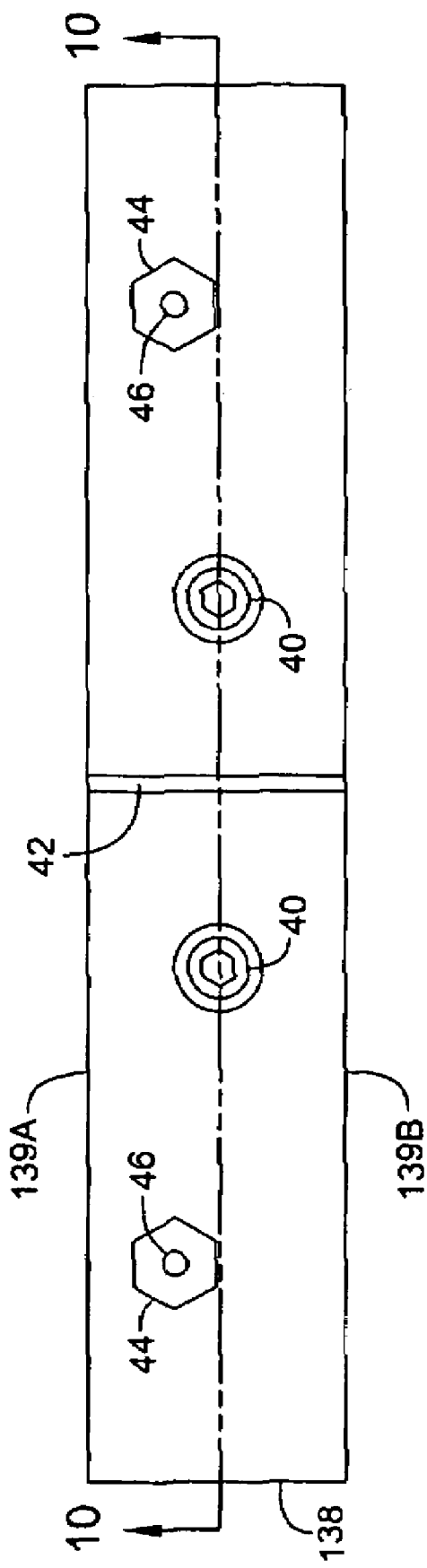
FIG. 9 is a side elevational view of an end cap in accordance with this invention, where the end cap has been configured to be separated to form two individual end caps.

End cap 38 in FIG. 7 has a pair of system ports 56A and 56B for each side of the circuit. Two bypass valves 44 are mounted in bypass ports 49 in end cap 38 to access each pair of ports 56A and 56B. Specifically, when bypass valve 44 is activated by member 46 being moved in a transverse direction against spring 47, openings 58A and 58B are moved into communication with both system ports 56A and 56B, enabling them to communicate with one another through passage 59, placing the unit in bypass. The two bypass valves 44 may be operated solely or in tandem when used in a dual pump configuration, such as shown in FIG. 7. The placement of a bypass valve 44 at each of the pair of system ports 56A and 56B facilitates the separation of end cap 138, shown in FIGS. 9 and 10, into two separate end cap units.

One feature of bypass valves 44 is their offset placement with respect to porting 56A and 56B, as can most readily be seen in FIGS. 4 and 7. The offset location permits free flow over the length of porting 56A and 56B while providing the benefit of a bypass function. Openings 51 are the intersections between bypass port 49 and system ports 56A and 56B. Opening 53 is the intersection of bypass port 49 and charge inlet 26A, although this opening is intentionally non-functional due to the shape of bypass valve 44 at this point and it is simply present due to the geometry of the structure.

Figure 10:
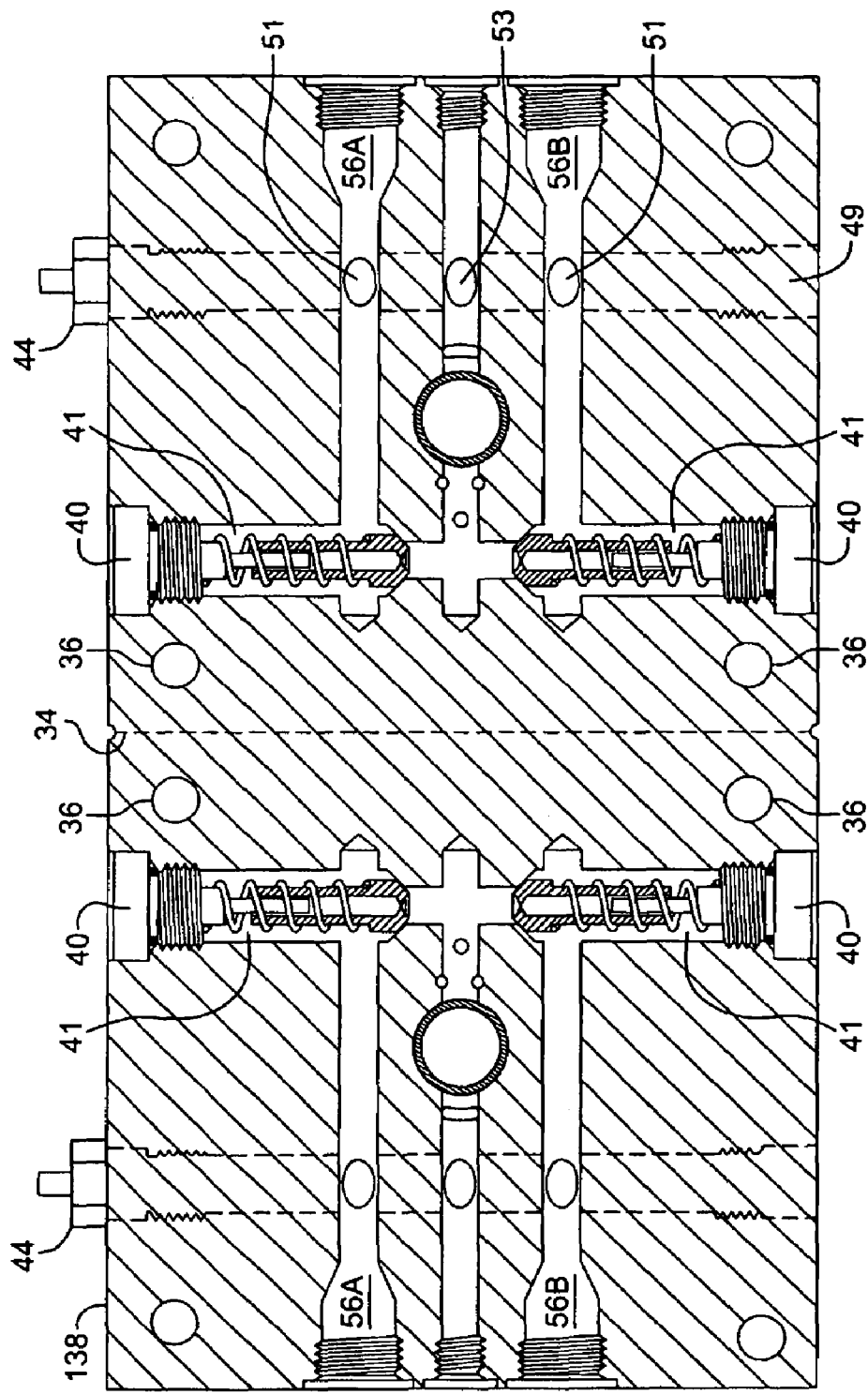
FIG. 10 is a cross-sectional view of an end cap, along the lines 10-10 in FIG. 9.

FIG. 10 shows an end cap 138 as an alternative design in accordance with this invention. End cap 38 as shown in FIGS. 4 and 7 and end cap 138 as shown in FIG. 10 are essentially identical but for the addition of passages 26A, 26B and 26C to end cap 38; thus, the manufacturer can use the same basic structure to create different end caps for different applications.

Figure 11:
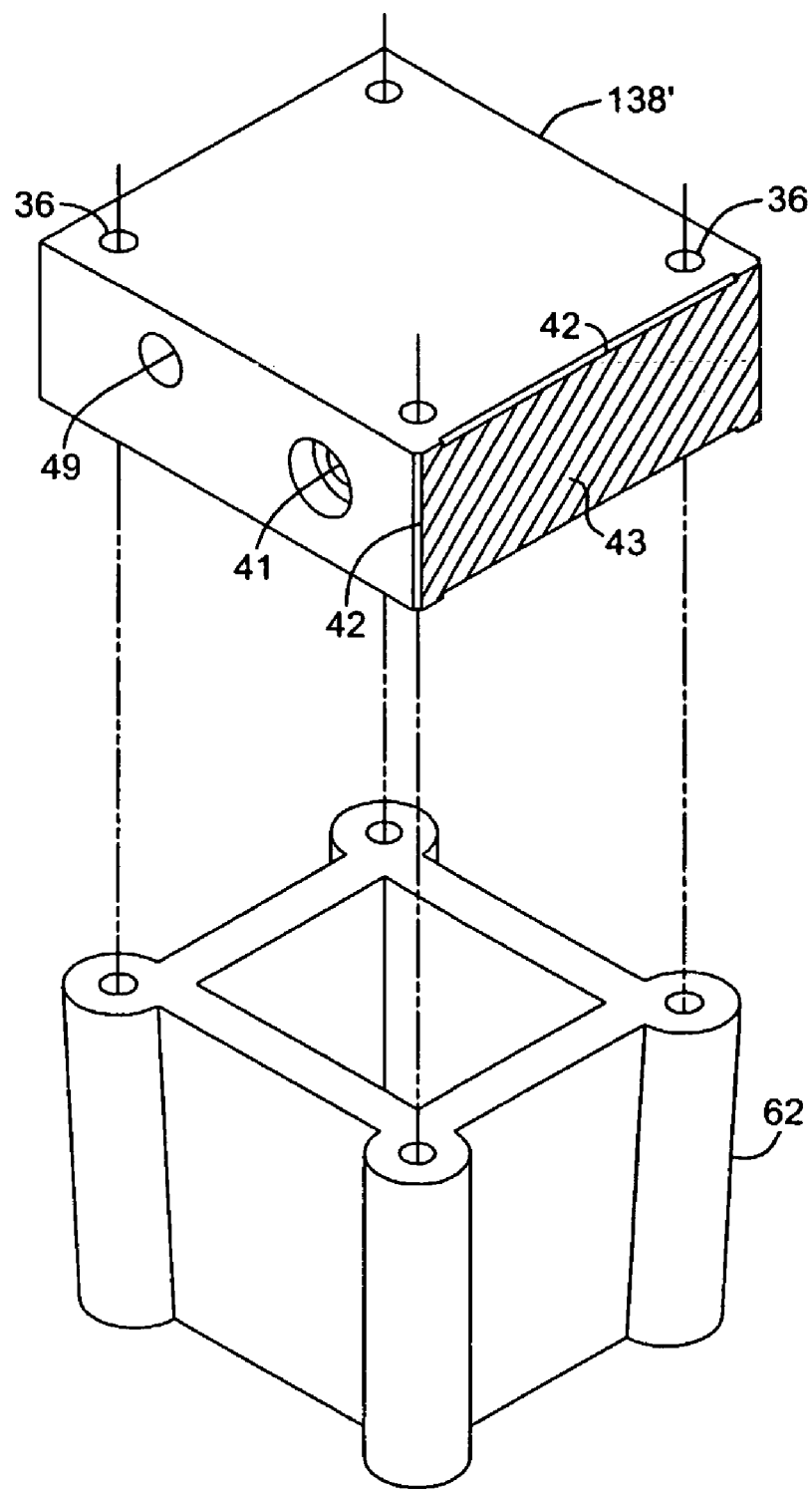
FIG. 11 is a simplified perspective view of an end cap in accordance with this invention and a pump housing element.

End cap 138 is configured to use two charge pumps (not shown) so that there are no porting or similar features crossing center line 34. Given that the hydraulic passageways in end cap 138 are separate from each other, and given that bolt holes 36 are on either side of line 34, end cap 138 may now be separated along line 34 by a cutting means such that two independent end caps may be created. These independent end caps may then be used as a part of a single pump unit, such as is shown in FIG. 11, where end cap 138 is secured to a housing element 62. Surface 43 indicates where end cap 138 was cut to create two separate units. It will be understood by one of skill in the art that FIG. 11 is a simplified view showing the arrangement of end cap 138 and a housing 62, with most features eliminated for clarity.

By creating two end caps simultaneously, the machining set up is simplified and machining operations are reduced. For example, all the features of one side of one end cap 38 are accomplished in one machining setup. The number of tool changes is thus reduced, and the number of parts handled in process is reduced. Furthermore, given that both dual pump end caps and individual end caps may be machined simultaneously using the same tooling fixtures, manufacturing complexity is reduced and costs are reduced.

Figure 12:
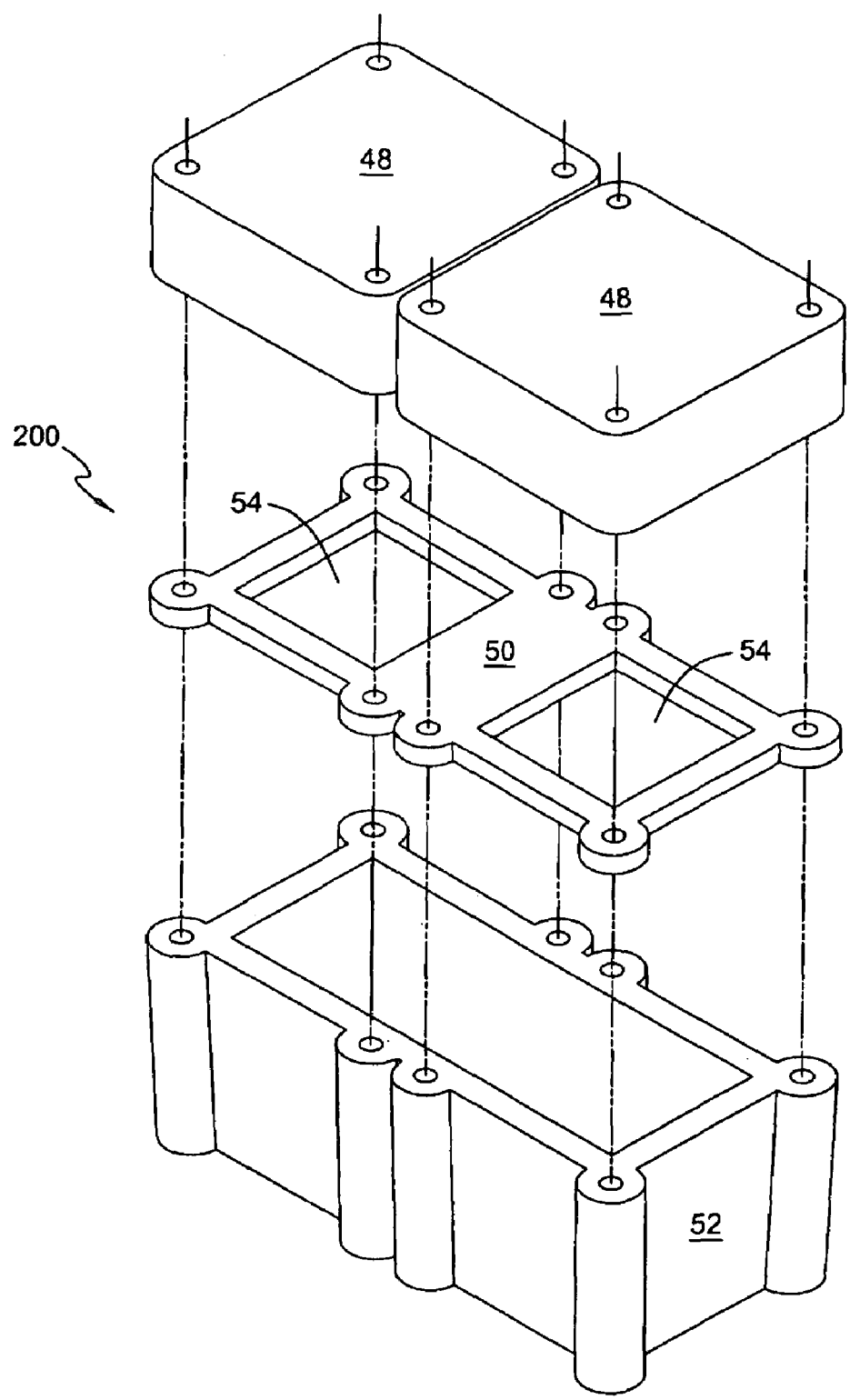
FIG. 12 is an exploded view of a further embodiment of the present invention showing the arrangement of the end caps, interface plate and common housing.
Figure 13:
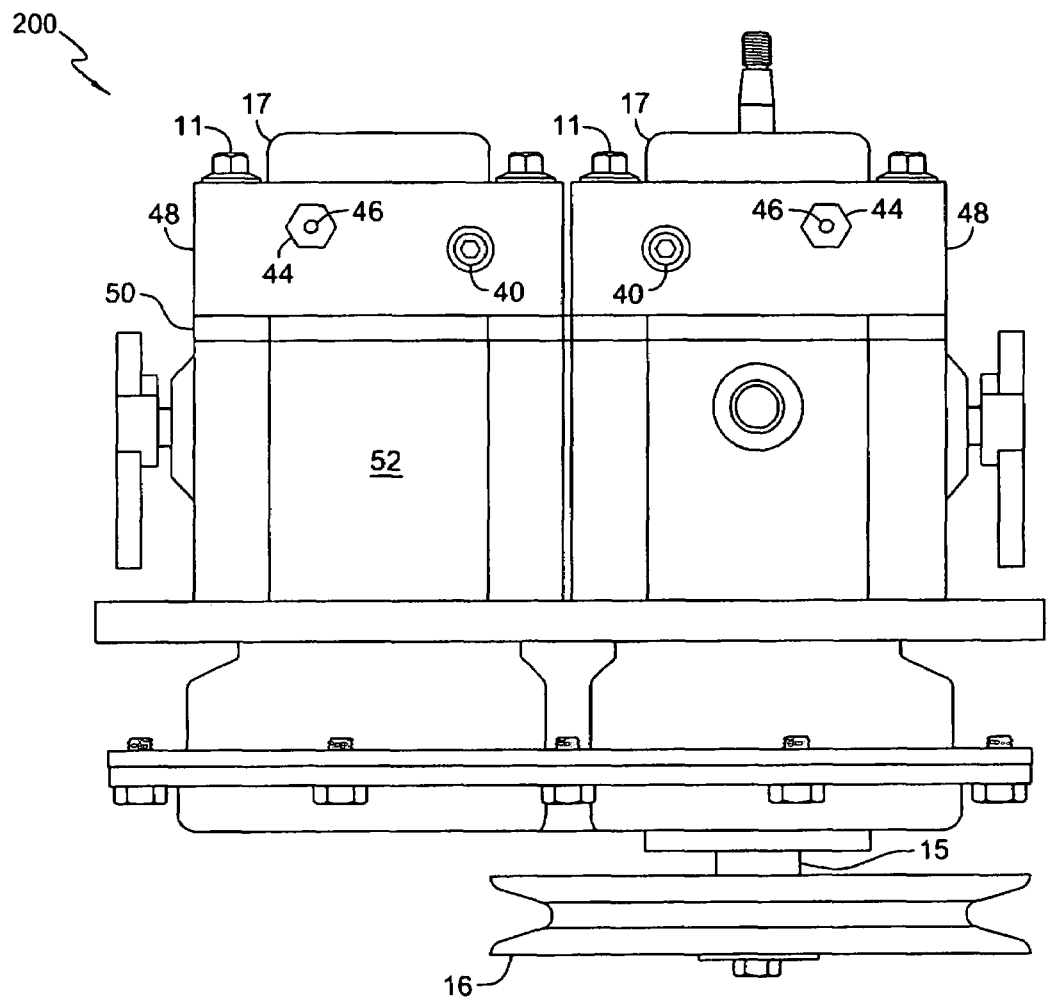
FIG. 13 is an elevational side view of a dual pump unit in accordance with the embodiment shown in FIG. 12.
Figure 14:
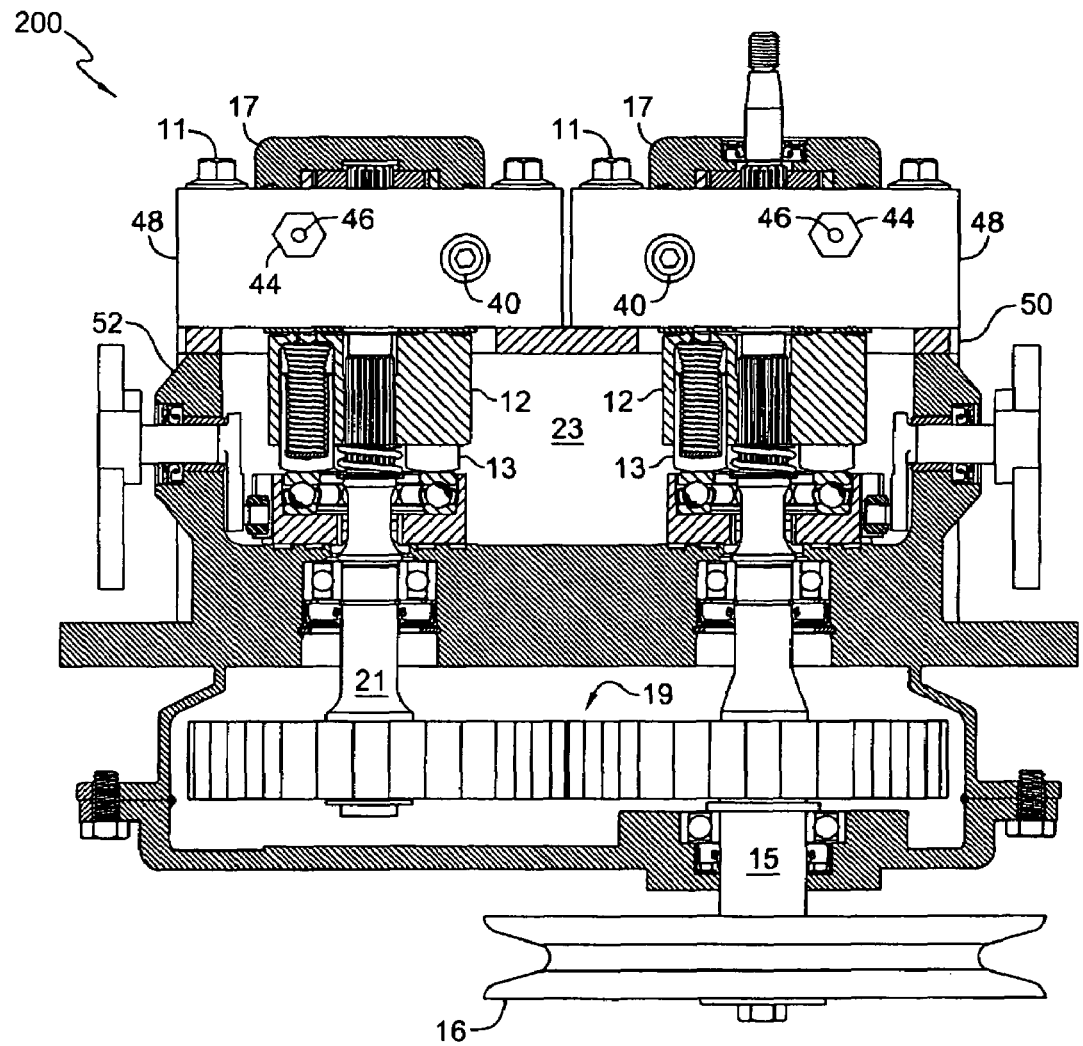
FIG. 14 is a cross-sectional side view of the dual pump unit shown in FIG. 13.

It may be also desirable to use two separate end caps to create a dual pump unit, instead of obtaining an end cap having the running surfaces, porting, etc. for both pumps. The embodiment depicted in FIGS. 12-14 show a dual pump unit 200 having two identical, but separate end caps 48. End caps 48 could be separate items such as end cap 28 in FIG. 2, or they could be of the type such as one generated from dual end cap 138 such as shown in FIG. 10. It will be understood that FIG. 12 is a simplified view which does not show any of the hydraulic elements, such as the cylinder blocks, porting and the like, in order to show the interaction of the depicted elements more clearly.

End caps 48 are attached to a housing 52 by means of an interface plate 50. Interface plate 50 has a generally flat interface with housing 52 such that once the bolts (not shown) used to attach end caps 48 to housing 52 are tightened, sealant or a formed gasket (not shown) in the interface between interface plate 50 and housing 52 will provide a seal to prevent oil that will be present in dual pump housing 52 from leaking from the interface. In a similar manner sealing is accomplished between end caps 48 and interface plate 50. The shape of interface plate 50 will depend solely on the shape of the housing 52 and other application requirements, thus giving the user additional flexibility.

Openings 54 formed in interface plate 50 provide clearance for the pump cylinder blocks (not shown) to be rotatably mounted against end caps 48. The shape of these will also be dictated by the application.

Although the invention has been described in terms of the single/dual end cap device of the preferred embodiment, a person of ordinary skill in the art, however, would understand that an apparatus and method for making and end cap suitable for configurations having greater than two pumps may be implemented without departing from the scope of the invention. Moreover, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

I claim:

1. An end cap for a hydraulic pump unit, comprising:
 a first end, a second end formed parallel to and opposite the first end, a plurality of sides connecting the first and second ends, a first surface formed between the two ends and the sides and a second surface formed opposite to the first surface;
 a first porting system formed in the end cap and comprising a first pair of system ports for hydraulic communication with a first hydraulic pump mounted on the first surface and a first charge pump located on the second surface and a first pair of openings formed on the first end and in communication with the first pair of system ports;
 a second porting system formed in the end cap and comprising a second pair of system ports for hydraulic communication with a second hydraulic pump mounted on the first surface and a second charge pump located on the second surface and a second pair of openings formed on the second end and in communication with the second pair of system ports;
 a first inlet in fluid communication with the first porting system and a sump, and a second inlet in fluid communication with the second porting system and the sump;
 a first bypass valve located in the end cap and hydraulically connected to the first porting system; and
 a second bypass valve located in the end cap and hydraulically connected to the second porting system.

2. The end cap as set forth in claim 1, further comprising a first set of check valve ports hydraulically connected to the first porting system and a second set of check valve ports hydraulically connected to the second porting system, wherein both sets of check valve ports are located between the first bypass valve and the second bypass valve.

3. The end cap as set forth in claim 2, wherein each set of check valve ports consists of one check valve port located on one side of the end cap and another check valve port located on the opposite side of the end cap.

4. The end cap as set forth in claim 1, wherein the first bypass valve intersects the first porting system at a periphery of the first bypass valve and the second bypass valve intersects the second porting system at a periphery of the second bypass valve.

5. The end cap as set forth in claim 1, wherein the first porting system is hydraulically segregated from the second porting system.

6. The end cap as set forth in claim 1, wherein the first porting system and the first bypass valve are positioned entirely on one side of a center line of the end cap and the second porting system and the second bypass valve are positioned entirely on the opposite side of the center line.

7. An end cap for a hydraulic pump unit, comprising:
 a first end, a second end formed parallel to and opposite the first end, a plurality of sides connecting the first and second ends, a first surface formed between the two ends and the sides and a second surface formed opposite to the first surface;
 a first porting system formed in the end cap and comprising a first pair of system ports for hydraulic communication with a first hydraulic pump mounted on the first surface and a first charge pump located on the second surface and a first pair of openings formed on the first end and in communication with the first pair of system ports;
 a second porting system formed in the end cap and comprising a second pair of system ports for hydraulic communication with a second hydraulic pump mounted on the first surface and a second charge pump located on the second surface and a second pair of openings formed on the second end and in communication with the second pair of system ports;
 an inlet port formed in the end cap and in fluid communication with the first and second porting systems and a sump, wherein the inlet port extends from an inlet opening formed on the first end of the end cap and is located between and parallel to the first pair of openings, and wherein the inlet port comprises the only hydraulic connection between the first and second porting systems; and
 a first bypass valve located in the end cap and hydraulically connected to the first porting system and a second bypass valve located in the end cap and hydraulically connected to the second porting system.

8. The end cap as set forth in claim 7, further comprising a first set of check valve ports hydraulically connected to the first porting system and a second set of check valve ports hydraulically connected to the second porting system, wherein both sets of check valve ports are located between the first bypass valve and the second bypass valve.

9. The end cap as set forth in claim 8, wherein each set of check valve ports consists of one check valve port located on one side of the end cap and another check valve port located on the opposite side of the end cap.

10. The end cap as set forth in claim 7, wherein the first bypass valve intersects the first porting system at a periphery of the first bypass valve and the second bypass valve intersects the second porting system at a periphery of the second bypass valve.

11. The end cap as set forth in claim 7, wherein the first porting system and the first bypass valve are positioned entirely on one side of a center line of the end cap and the second porting system and the second bypass valve are positioned entirely on the opposite side of the center line.

12. An end cap for a hydraulic pump unit, comprising:
 a first end, a second end formed parallel to and opposite the first end, a plurality of sides connecting the first and second ends, a first surface formed between the two ends and the sides and a second surface formed opposite to the first surface;
 a first porting system formed in the end cap and comprising a first pair of system ports for hydraulic communication with a first hydraulic pump mounted on the first surface, a first pair of openings formed on the first end and in communication with the first pair of system ports;
 a second porting system formed in the end cap and comprising a second pair of system ports for hydraulic communication with a second hydraulic pump mounted on the first surface, a second pair of openings formed on the second end and in communication with the second pair of system ports;
 a first bypass valve located in a first bypass port formed in the end cap and hydraulically connected to the first porting system;
 a second bypass valve located in a second bypass port formed in the end cap and hydraulically connected to the second porting system; and a first set of check valve ports located in the end cap and hydraulically connected to the first porting system and a second set of check valve ports located in the end cap and hydraulically connected to the second porting system, wherein both sets of check valve ports are located between the first bypass port and the second bypass port.

13. An end cap as set forth in claim 12, wherein the first set of check valve ports are formed parallel to the second set of check valve ports.

14. An end cap as set forth in claim 12, wherein the first set of check valve ports are formed parallel to the first bypass port.

15. An end cap as set forth in claim 12, wherein the first bypass port is parallel to the second bypass port.

16. An end cap as set forth in claim 12, wherein both sets of check valve ports are formed parallel to both of the bypass ports.

17. An end cap for a hydraulic pump unit, comprising:

a first end, a second end formed parallel to and opposite the first end, a plurality of sides connecting the first and second ends, a first surface formed between the two ends and the sides and a second surface formed opposite to the first surface;

a first porting system formed in the end cap and comprising a first pair of system ports for hydraulic communication with a first hydraulic pump mounted on the first surface, and a first pair of openings formed on the first end and in communication with the first pair of system ports;

a second porting system formed in the end cap and comprising a second pair of system ports for hydraulic communication with a second hydraulic pump mounted on the first surface, and a second pair of openings formed on the second end and in communication with the second pair of system ports wherein the center axes of the first and second pairs of system ports are located in a first plane parallel to the first surface of the end cap;

first and second bypass ports formed in the end cap, wherein the center axes of both bypass ports lie in a second plane offset from and parallel to the first plane, such that the first bypass port intersects the first pair of system ports at the periphery of the first bypass port and the second bypass port intersects the second pair of system ports at the periphery of the second bypass port.

* * * * *